United States Patent [19]
Lotz, Jr.

[11] Patent Number: 4,719,264
[45] Date of Patent: Jan. 12, 1988

[54] WATER-REDUCIBLE, WATER-REMOISTENABLE ADHESIVE COMPOSITION

[75] Inventor: Edward L. Lotz, Jr., Louisville, Ky.

[73] Assignee: Interez, Inc., Louisville, Ky.

[21] Appl. No.: 889,315

[22] Filed: Jul. 23, 1986

[51] Int. Cl.$^4$ .................. C08L 39/04; C08L 3/02; C08K 5/07

[52] U.S. Cl. .................. 525/203; 524/47; 524/48; 524/732; 524/733; 524/734

[58] Field of Search ............. 524/47, 48, 732, 733, 524/734; 525/203

[56] References Cited

U.S. PATENT DOCUMENTS

| | | | |
|---|---|---|---|
| 2,793,966 | 1/1954 | Danio | 117/122 |
| 2,808,381 | 8/1955 | Stone | 524/42 |
| 2,917,396 | 10/1957 | Agulnick | 106/128 |
| 2,978,343 | 10/1958 | Russo | 106/128 |
| 3,104,129 | 6/1962 | Prior | 117/122 |
| 3,200,094 | 3/1962 | Sederlund | 524/47 |
| 3,202,539 | 12/1963 | Molt, Jr. et al. | 117/122 |
| 3,425,968 | 9/1965 | Reiling | 524/37 |

*Primary Examiner*—Delbert R. Phillips
*Assistant Examiner*—Nathan M. Nutter
*Attorney, Agent, or Firm*—Herbert P. Price

[57] ABSTRACT

Water reducible, water-remoistenable adhesive compositions are made from a blend of (a) an aqueous emulsion of a polymer of vinyl acetate, (b) an organic solvent solution of a copolymer of vinyl acetate and vinyl pyrrolidone having dextrin dispersed therein, and (c) an aqueous emulsion of an ester gum tackifier.

8 Claims, No Drawings

WATER-REDUCIBLE, WATER-REMOISTENABLE ADHESIVE COMPOSITION

BACKGROUND OF INVENTION

The field of art to which this invention pertains is water remoistenable adhesive compositions.

Remoistenable adhesives are dry adhesives composition which, when moistened with water, develop an adhesive tackiness. Such adhesives are used, for example, on postage stamps, labels and envelope flaps.

Remoistenable adhesives have been prepared by dissolving a water soluble resin in a suitable solvent and then applying the solution to the paper. Adhesive coated paper produced in this manner is troublesome in practical use because of the tendency of the coated sheet to curl or roll up. This effect is due to the fact that the paper backing and the adhesive layer respond differently to changes in atmospheric moisture content. Both the paper backing and the adhesive layer expand as they absorb moisture from the atmosphere and contract as they release moisture to the atmosphere. However, normally, this behavior is much more pronounced in the adhesive layer which expands or contracts to a greater degree than the paper backing. If such a sheet of adhesive coated paper is subjected to an atmosphere of high moisture content, the adhesive layer will expand more than the paper backing causing the sheet to curl away from the adhesive side. If the sheet is subjected to an atmosphere of low moisture content, the adhesive layer will contract more than the paper backing causing the paper to curl toward the adhesive side.

Manufacturers have attempted to overcome this curling effect by passing the coated sheet over a series of bars set at various angles which cause the adhesive layer to be broken into small sections. Theoretically, each small section thus produced reacts to variation in moisture content of the atmosphere independent of all other sections thus lessening the tendency of the sheet to curl. In actual practice this technique is only partially effective since that portion of the adhesive layer in contact with the paper surface is reinforced by paper fibers and is particularly resistant to rupture. Even though the surface of the adhesive layer is broken, that portion of the film in contact with the paper remains continuous and reacts to variations in atmospheric moisture content with sufficient force to curl.

U.S. Pat. No. 2,793,966 describes a remoistenable adhesive composition which when used on paper overcomes this curling tendency. The adhesive composition is made by dispersing finely divided dextrin in an organic solvent solution of a film forming resin. When this composition is applied to paper and the solvent is evaporated off, a solid remoistenable film is produced which to the naked eye appears continuous and homogeneous. In actuality, the film is composed of an aggregation of minute discrete particles of solid dextrin which are adhered to the paper by the film forming polymer. Paper coated with this adhesive has been found to be substantially non-curling.

U.S. Pat. No. 3,202,539 describes non-curling gummed papers made by blending a water soluble powder glue in a dry powder water insoluble binder material. This mixture is applied to the substrate and the binder material is fused to a continuous film with heat.

U.S. Pat. No. 2,917,396 describes a water remoistenable material which is made of a dispersion of an aqueous solution of a water activatable gum dispersed in a water immiscible solvent solution of a water soluble resinous binder.

U.S. Pat. No. 2,978,343 describes a remoistenable adhesive composition made from a solution of a water soluble adhesive in a water immiscible organic solvent, and a second water soluble adhesive which is suspended in the solution and which is insoluble in the particular organic solvent used, plus a critical amount of water.

Pre-moistenable adhesives are made according to U.S. Pat. No. 3,200,094, by dispersing dextrin in a water/organic solvent solution of polyvinyl alcohol.

U.S. Pat. No. 3,425,968 describes water remoistenable adhesives made by dissolving a glue, such as dextrin, in water and mixing this solution with a solution of a water insoluble binder in a organic solvent.

As can be seen, various attempts have been made to solve the curl problems of water remoistenable adhesives. Some of these adhesives are totally organic and contain organic solvents which cause environmental pollution problems. Others are unstable in the package. The dispersed glues have a tendency to settle out and cake which cause problems in use. The water present in some of these compositions will dissolve the dispersed water soluble glue with time, resulting in adhesives which when applied cause curling of the paper substrate.

SUMMARY OF INVENTION

This invention pertains to water remoistenable adhesive compositions. In one aspect, this invention relates to water remoistenable adhesive compositions which are water reducible. In another aspect, this invention pertains to water reducible, water remoistenable adhesive compositions which when applied to paper do not cause the paper to curl.

The compositions of this invention are remoistenable adhesives made by blending (a) an aqueous emulsion of a polymer of vinyl acetate and a dextrin compatible hydrophilic colloid with (b) an organic solvent solution of a copolymer of vinyl acetate and vinyl pyrrolidone having dextrin dispersed therein and (c) an aqueous emulsion of ester gum tackifier. The components of the blend are present in the amount of about 35 to about 45 parts by weight of (a), about 35 to about 45 parts by weight of (b) and about 10 to about 30 parts by weight of (c), the total being 100 parts. Sufficient water is added to the blend to adjust the solids content of the remoistenable adhesive composition to about 40 to about 55 weight percent and a viscosity at 25° C. of about 1,000 to about 3,000 cps.

The water remoistenable adhesive compositions of this invention have a low volatile organic content and are stable with long shelf life. They can readily be reduced with water and, when applied to paper, are substantially non-curling.

DETAILED DESCRIPTION OF THE INVENTION

The aqueous emulsions useful in this invention are aqueous emulsions of polymers of vinyl acetate and a dextrin compatible hydrophilic colloid as described in U.S. Pat. No. 2,808,381, which is hereby incorporated by reference. The vinyl acetate polymer can be a homopolymer or a copolymer. Comonomers which can be copolymerized with the vinyl acetate are alkyl esters of acrylic or methacrylic acid wherein the alkyl groups contains 1 to about 8 carbon atoms. Examples of such comonomers are methyl methacrylate, ethyl acrylate, butyl acrylate, butyl methacrylate and 2-ethylhexyl acrylate. Useful copolymers contain at least about 60 weight percent vinyl acetate. The preferred polymer is a homopolymer of vinyl acetate. The aqueous emulsions have a solid content of about 40 to about 65 weight percent.

The copolymer which is dissolved in the organic solvent is a copolymer of vinyl acetate and vinyl pyrrolidone wherein the copolymer contains about 85 to about 97 weight percent vinyl acetate, and about 3 to about 15 weight percent vinyl pyrrolidone.

Organic solvents in which the vinyl acetate-vinyl pyrrolidone polymers are dissolved are any non-reactive substantially water immiscible solvents in which the polymer is soluble. Examples of such solvents are hydrocarbons, e.g. toluene and xylene, esters, e.g. ethyl acetate, isopropyl acetate, and butyl acetate, ketones, e.g. methyl isobutyl ketone and methyl isoamyl ketone and the like. Preferred solvents are a blend of ethyl acetate and toluene.

The dextrins useful in this invention are commercial dextrins made by heating starches alone or with a small quantity of acid or by heating an aqueous slurry of starch in the presence of an acid or an enzyme. Useful dextrins are made from corn, potato, barley, wheat, rye, sago or arrowroot starch. The dextrins are finely ground having a particle size as measured on the Hegman scale of about 5 or greater. The dextrins are insoluble in the organic solution of vinyl acetate-vinyl pyrrolidone polymer and are dispersed as a solid material in the organic solution.

The organic solution of vinyl acetate/vinyl pyrrolidone polymer and dispersed dextrin will contain about 40 to about 60 weight percent dispersed dextrin and about 10 to about 15 weight percent copolymer of vinyl acetate and vinyl pyrrolidone.

About 10 to about 25 weight percent of the copolymer of vinyl acetate and vinyl pyrrolidone can be replaced with an aliphatic polyester of adipic acid and diethylene glycol having a Gardner-Holdt viscosity at 25° C. of about $Z_1$ to about $Z_4$.

The third component of the compositions of this invention, is an aqueous emulsion of an ester gum having a solids content of about 45 to about 55 weight percent. The ester gum is the glycerin ester of rosin having a melting point of about 90° C. to about 105° C. The ester gum emulsion imparts additional tack to the adhesive formulation.

The water remoistenable adhesive compositions of this invention are made by blending the aqueous emulsion of the polymer of vinyl acetate with the organic solvent solution of the copolymer of vinyl acetate and vinyl pyrrolidone having dextrin dispersed therein, followed by the addition of the tackifier. Additional water can be added to reduce the composition to the appropriate solids content and viscosity. The resulting composition is then applied to an appropriate substrate, usually paper, and is dried to form a remoistenable adhesive on the surface of the substrate.

Various flavoring agents can be added to the adhesive composition to enhance the taste of the adhesive when remoistened with the tongue.

The following examples describe the invention in more detail. Parts and percentages, unless otherwise indicated, are parts and percentages by weight.

EXAMPLE 1

Vinyl Pyrrolidone/Vinyl Acetate Copolymer

To a suitable reactor were added 8,424 parts of vinyl acetate, 4,826 parts of ethyl acetate, 845 parts of N-vinyl-2-pyrrolidone, 725 parts of toluene, and 4.3 parts of 2,2'-azobis(isobutyronitrile). The reactants were heated to reflux (170° F.) and were held at reflux for 1 hour. A solution of 4.3 parts of 2,2'-azobis(isobutyronitrile) and 7.5 parts of ethyl acetate was then added. Heating at reflux was continued for 2 hours. Additional catalyst solution, 2 parts of catalyst and 7.5 parts of ethyl acetate, was then added. Heating was then continued at reflux to complete the polymerization reaction, i.e., until the solids content reached about 56 percent. The temperature was then lowered and 2,246 parts of a diethylene glycol-adipic acid copolymer having a Gardner-Holdt viscosity of $Z_1$ to $Z_4$ were added along with 1,404 parts of toluene. After stirring for 1 hour, an additional 1,900 parts of toluene were added.

The resulting polymer solution had a solids content of 56.4 percent, a viscosity of 20,000 cps and an acid value of 7.

EXAMPLE 2

To a pebble mill were added 2,435 parts of ethyl acetate, 1,267 parts of the copolymer solution of Example 1 and 5,031 parts of dextrin. With cooling water on the mill the contents were ground for 18 hours until a hegman grind of 5.5 was obtained. At the end of the grinding period, 1,267 parts of the copolymer solution of Example 1 were added, followed by additional grinding for 1 hour. 376 parts of ethyl acetate were then added to adjust the solids and the viscosity.

The resulting dispersion had a solids content of 64.5 percent and a viscosity of 2,200 cps. The partical size was 5.5 on the Hegman scale.

EXAMPLE 3

To a suitable reactor were added 30.43 parts of an aqueous emulsion of a homopolymer of vinyl acetate having a solids content of 56 percent, a viscosity of 1,150 cps and a pH of 4.5 and 22.37 parts of deionized water. After thoroughly mixing, 30.43 parts of the organic dispersion of Example 2 were added followed by 16.67 parts of an emulsion of ester gum having a solids content of 49 percent, a pH of 9.3 and a density of 8.5 pounds per gallon. After thoroughly blending all of the components, 0.1 part of spearmint flavoring was added. The resulting remoistenable adhesive composition had a solids content of 45 percent, a viscosity of 1,350 cps and a weight per gallon of 9.2 pounds.

EXAMPLE 4

The remoistenable adhesive composition of Example 3 was applied to paper at a coat weight of 6 pounds per ream (3000 sq. ft.) and was dried. The coated substrate exhibited very little curl. When moistened, the adhesive exhibited good wet tack and when dried good adhesion permanence. When applied at a coat weight of 12 pounds per ream, the wet tack was good and the adhesion permanence was excellent.

The polyvinyl acetate emulsion described in Example 3, when used alone, exhibited no wet tack and no adhesion permanence. The polyvinyl acetate-polyvinyl pyrrolidone-dextrin dispersion exhibited no wet tack when applied at a coat weight of 6 pounds. However, at 12 pounds, the wet tack was good and adhesion permanence was excellent.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A remoistenable adhesive composition comprising a blend of:
   (a) a aqueous emulsion of a polymer of vinyl acetate and a dextrin compatible hydrophilic colloid;
   (b) an organic solvent solution of a copolymer of vinyl acetate and vinyl pyrrolidone having dextrin dispersed therein;
   (c) an aqueous emulsion of an ester gum tackifier, and
   (d) sufficient water to adjust the solids content of the composition to about 40 to about 55 weight percent and the viscosity of 25° C. to about 1,000 to about 3,000 cps, wherein (a), (b) and (c) are present in the weight ratio of about 35 to about 45 parts of (a), about 35 to about 45 parts of (b) and about 10 to about 30 parts of (c).

2. The composition of claim 1 wherein the aqueous emulsion of (a) has a solid content of about 40 to about 65 weight percent.

3. The composition of claim 1 wherein the polymer of vinyl acetate in (a) is a homopolymer.

4. The composition of claim 1 wherein the polymer of vinyl acetate in (a) is a copolymer of vinyl acetate and an alkyl acrylate or methacrylate wherein the alkyl group contains from 1 to 8 carbon atoms and wherein the copolymer contains at least 60 weight percent vinyl acetate.

5. The composition of claim 1 wherein the copolymer of (b) contains about 85 to about 97 weight percent vinyl acetate and about 3 to about 15 weight percent vinyl pyrrolidone.

6. The composition of claim 1 wherein (b) contains about 40 to about 60 weight percent dispersed dextrin and about 10 to about 15 weight percent copolymer of vinyl acetate and vinyl pyrrolidone.

7. The composition of claim 6 wherein about 10 to about 25 weight percent of the copolymer of vinyl acetate and vinyl pyrrolidone is replaced with aliphatic polyester of adipic acid and diethylene glycol having a Gardner-Holdt viscosity at 25° C. of about $Z_1$ to about $Z_4$.

8. The composition of claim 1 wherein (c) is a liquid emulsion of ester gum having a solids content of about 45 to about 55 weight percent.

* * * * *